United States Patent
Poston et al.

(10) Patent No.: US 6,789,407 B1
(45) Date of Patent: Sep. 14, 2004

(54) DETECTOR FOR A METER PROVER

(75) Inventors: Mike R. Poston, Sapulpa, OK (US); Jerry W. Vess, Claremore, OK (US)

(73) Assignee: Weamco, Incorporated, Tulsa, OK (US)

( * ) Notice: Subject to any disclaimer, the term of this patent is extended or adjusted under 35 U.S.C. 154(b) by 0 days.

(21) Appl. No.: 10/425,768

(22) Filed: Apr. 29, 2003

(51) Int. Cl.[7] .............................................. G01F 25/00
(52) U.S. Cl. ........................................................ 73/1.18
(58) Field of Search ............................ 73/1.18, 865.8; 200/61.41; 116/204, 202, 281, 203, 209

(56) References Cited

U.S. PATENT DOCUMENTS

| | | | |
|---|---|---|---|
| 4,079,619 A | * | 3/1978 | Dobesh ...................... 73/1.01 |
| 4,481,806 A | | 11/1984 | Schad ............................. 73/3 |
| 4,491,018 A | * | 1/1985 | Stringer et al. ............ 73/865.8 |
| 4,517,771 A | * | 5/1985 | Kobayashi et al. ......... 451/327 |
| 5,263,220 A | * | 11/1993 | Campbell .............. 15/104.063 |

* cited by examiner

*Primary Examiner*—Robert Raevis
(74) *Attorney, Agent, or Firm*—Head, Johnson & Kachigian

(57) ABSTRACT

A detector for a meter prover. The detector includes a non-ferromagnetic barrel having a cylindrical bore formed longitudinally therethrough. A magnetic proximity switch is mounted in the bore near one end of the barrel. A ferromagnetic piston is disposed in the bore near the other end of the barrel. A spring urges the piston away from the proximity switch. A pair of wipers surrounds the piston and forms a fluid tight seat between the bore and the piston. A passageway extends longitudinally through the length of the piston in order to permit fluid flow therethrough.

15 Claims, 1 Drawing Sheet

DETECTOR FOR A METER PROVER

BACKGROUND OF THE INVENTION

1. Field of the Invention

The present invention is directed to a meter prover or calibrator to detect passage of a traveling liquid displacer in a pipe-type meter prover. In particular, the present invention is directed to a meter prover or calibrator that will operate in dirty service or non-lubricating service conditions.

2. Prior Art

Liquid passing through a pipeline conduit is often measured by a meter or meters that are installed in the pipeline. The accuracy of the meter or meters on the pipeline is an extremely important consideration. In the petrochemical industry, for instance, title to the oil or petrochemical products may pass from one party to another with the passage through a pipeline. Likewise, the price is often determined by the amount of oil or petrochemical products delivered as determined by the meter. Accordingly, it is extremely important for the meter or meters to be accurate.

Additionally, it is common practice for a contract for the sale of the oil or petrochemical products to call for periodic proving, or calibration, of the meter. Prover devices have been devised over the years in order to calibrate the meters.

There are various types of provers such as a volumetric tank prover having a calibrated tank or vessel with a sight gauge and scale to read a metered volume. Additionally, there are unidirectional provers, which are positive displacement type provers, where flow of fluid is in a single direction moving a displacement sphere. The flow of fluid and the displacement sphere travel in a single direction by means of a transfer chamber or interchange. Additionally, bidirectional provers utilize a positive displacement type prover where the flow and the liquid displacement sphere travel in alternate directions by means of a four-way diverter valve.

In one type of a bidirectional prover, liquid flow goes into a four-way diverter valve and forces a sphere displacer into a pipe section which seals against the pipe walls. In one arrangement, an inflatable sphere of urethane, neoprene or nitrile is utilized. The sphere is inflated from 2% to 4% larger than the pipe inside diameter. The sphere displacer passes between two detectors. The volume of liquid between the detectors is known as the calibrated volume. This calibrated volume is then compared to the volume indicated by the meter in order to determine a meter factor as follows.

$$\text{Meter Factor} = \frac{\text{Acutal Calibrated Volume}}{\text{Metered Volume}}$$

There are various types of detectors. One type of detector device is disclosed in Assignee's U.S. Pat. No. 4,481,806. A spring loaded piston extends from a barrel bore into the prover pipeline. As the displacer sphere passes the detector, it causes the piston to move axially toward a proximity switch which makes contact or makes a switch.

The prover, once liquid is inserted therein, is under pressure. Accordingly, the bore of the detector in which the piston operates will likewise be pressurized to the same degree. Accordingly, the detector must provide for pressure balancing and pressure relief of the bore.

In some cases, the piston will be lubricated or will utilize the oil in the system for lubrication. Other applications include non-lubricating services, such as LPG service where the fluid does not provide lubrication of the detector. In other situations, known as "dirty service", solids, such as metal particles, sand and other solid materials, will be transported in the fluid. One example would be a crude oil containing a certain amount of solid particles. Solids may also be present from construction debris, deterioration or abrasion in the pipeline. This may cause the piston or the switch internal bore to be marred. Over time, if the piston or bore is marred, it will interfere with its operation. Accordingly, it would be advisable to seal the interface between the piston and the bore from solids or other debris.

Likewise, it would be desirable to periodically flush the bore of any fluids to provide pressure relief and to also clean the barrel.

SUMMARY OF THE INVENTION

The present invention is directed to a detector for a meter prover having a pipe segment and a displacement sphere. The detector includes a barrel formed from a number of components, including a base affixed by welds or otherwise to the external surface of a pipeline of a prover. The barrel includes a removable adapter having a seal, such as an O-ring, between the adapter and the base to form a fluid tight seal. The barrel also includes a hub and a face plate. The base, the adapter, the hub and the face plate combine to form a cylindrical bore. A cylindrical piston is mounted in the bore. In the rest position, one end of the piston extends into a pipe of the meter prover.

The hub includes external threads to mate with and engage a housing having internal threads. The hub also includes an internal threaded opening to receive a magnetic proximity switch.

Juxtaposed between the proximity switch and the piston is a spring, such as a coil spring, to urge the piston away from the magnetic proximity switch.

A pair of seals or wipers, such as O-rings, surround the piston to form a fluid tight seal between the bore and the external surface of the piston. The seals or wipers reside in recesses formed into the adapter so that the wipers prevent accumulation of solids, and provide smooth operation.

The piston also includes a fluid passageway through the center axis of the piston. As the sphere moves, it displaces the piston axially towards the proximity switch. At the same time, fluid in the bore will be moved or flushed from the bore, through the passageway, and back into the prover.

As the sphere passes the piston, it may have a tendency to seal the end of the piston. A plurality of pressure equalization ports are provided to provide pressure relief and allow fluid to escape therethrough.

DETAILED DESCRIPTION OF THE PREFERRED EMBODIMENTS

Figure 1:
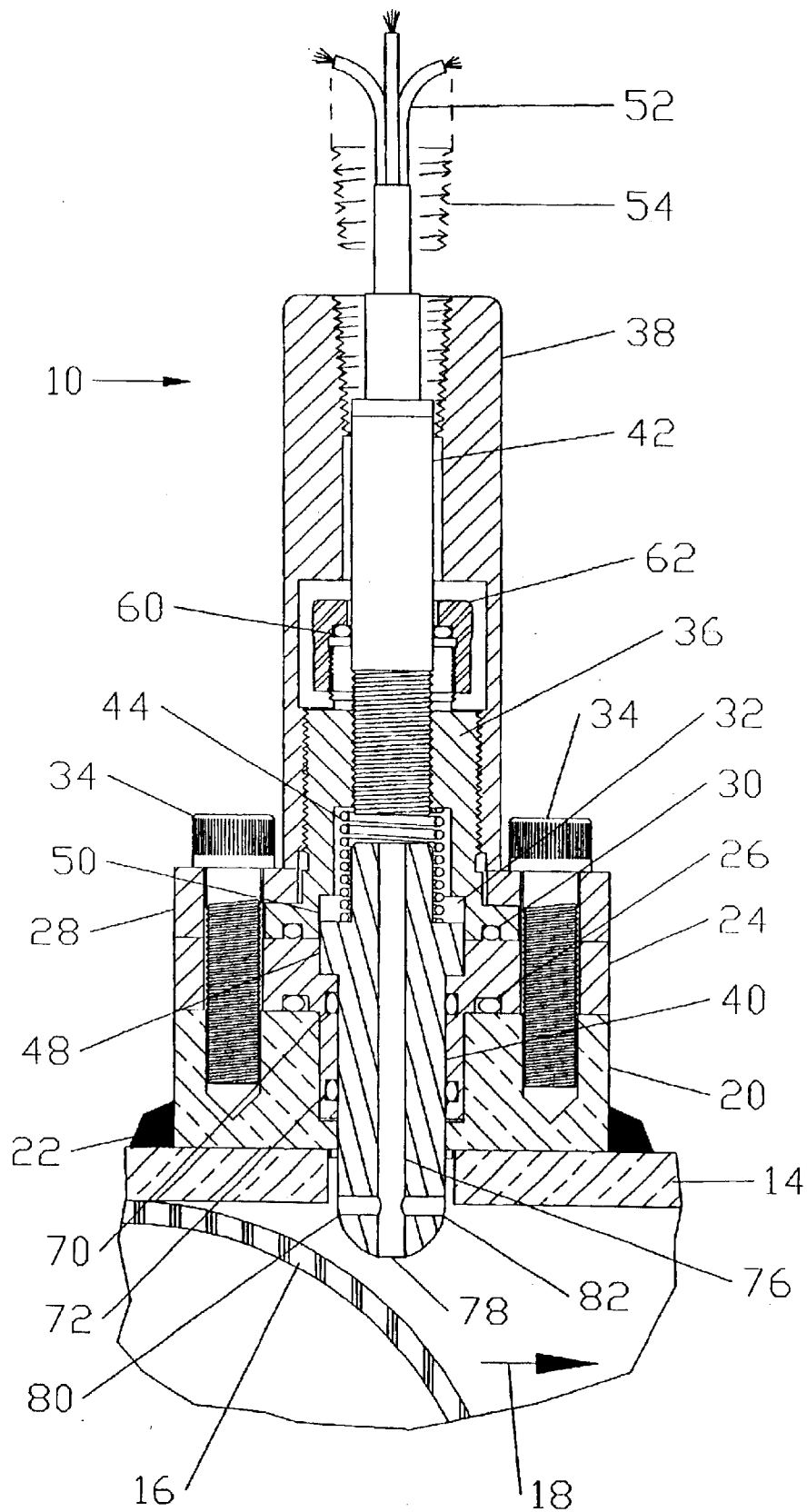
FIG. 1 is a partial, sectional view of a detector for a meter prover shown attached to a meter prover constructed in accordance with the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 shows a partial, sectional view of a detector 10 constructed in accordance with the present invention for use with a meter prover 14, a portion of which is visible in FIG. 1. The meter prover 14 will include an inflatable sphere 16 which is moved by fluid force through a pipeline portion of the prover in a direction such as direction shown by arrow 18.

The detector 10 includes a barrel formed from a number of discrete components, including a base 20 which is affixed by welds 22 or otherwise affixed to the external surface of a pipeline of the prover 14. The base 20 may have an arched or arcuate surface to mate with the external surface of the pipe. The opposed surface of the base will be planar. The base will be mounted over an opening in the pipeline of the prover 14. The barrel also includes a removable adapter 24 having a seal such as an O-ring 26 between the adapter 24 and the base 20 to form a fluid tight seal. The barrel also includes a face plate 28. Finally, the barrel includes a hub 36 with a seal such as an O-ring 30 between the adapter 24 and the hub 36. The base is counter bored to provided an enlarged diameter recess portion to receive a protrusion of the adapter.

The base 20, the adapter 24, and the hub 36 combine to form a cylindrical bore 32. The base 20, the adapter 24, the hub 36 and the face plate 28 are removably fastened together by fasteners such as machine screws 34.

The components forming the barrel may be formed of non-ferromagnetic material.

A cylindrical piston 40 constructed of ferromagnetic material is mounted in the bore. In the rest position, one end 78 of the piston 40 extends into the pipe 14. In the present embodiment, the end 78 of the piston is spherical.

The hub 36 includes external threads to mate with and engage a housing 38. The hub 36 also includes an internal threaded opening to receive a magnetic proximity switch 42. The proximity switch 42 may take many configurations including a single pole double throw switch (SPDT) or a double pole double throw switch (DPDT). Extending from the proximity switch are wires 52 which may be directed through a conduit (shown in dashed lines 54) having a threaded male end.

The proximity switch is axially aligned with the piston.

The proximity switch 42 does not require any adjustment and is, in fact, non-adjustable. Accordingly, the proximity switch is tamper-proof, adding to the reliability of the detector.

The internal threaded opening of the hub and portions of the magnetic switch may be coated with epoxy resin to bond the switch in place.

Juxtaposed between the proximity switch 42 and a piston 40 is a spring 44, such as a coil spring, to urge the piston 40 away from the magnetic proximity switch. The spring 44 will likewise be of non-ferromagnetic material.

The piston 40 also includes an extending flange 48 which resides and travels in a recess 50 in the bore. A seal such as an O-ring 60 surrounds the magnetic proximity switch and is held in place by a threaded seal cap 62 within the housing.

A pair of wipers or seals such as O-rings 70 and 72 surround the piston 40 and form a fluid tight seal between the bore 32 and the external cylindrical surface of the piston 40. In the present embodiment, a pair of Teflon O-rings are utilized as wipers. It will be understood that the wipers may be fabricated from various materials. The wipers 70 and 72 reside in recesses formed into the adapter 24. Accordingly, the wipers will prevent accumulation of solids.

Use of a pair of wipers assists in balancing the piston 40 in order to keep it centered in the bore. The wipers prevent metal to metal contact of the piston with the barrel.

The piston 40 also includes a fluid passageway 76 through the axis of the piston 40. Accordingly, as the sphere 16 moves in the direction of arrow 18, it displaces the piston axially towards the proximity switch. At the same time, fluid in the bore will be moved from the bore through the passageway 76 and back into the prover. Any solids in the bore, will tend to be flushed back to the pipeline 14.

As the sphere 16 moves through the pipeline and passes the piston 40, it may have a tendency to seal the end 78 of the piston. A plurality of pressure equalization ports 80, 82 are provided to provide pressure relief and allow fluid to escape therethrough.

To access the wipers 70 and 72, the machine screws 34 are unthreaded from the base 20 and adapter 24, and then the face plate, the hub, and adapter are removed.

It will be appreciated that the present invention may be retrofitted to existing detectors by substituting an adapter and a piston and adding the wipers.

Whereas, the present invention has been described in relation to the drawings attached hereto, it should be understood that other and further modifications, apart from those shown or suggested herein, may be made within the spirit and scope of this invention.

What is claimed is:

1. A detector for a meter prover comprising:
   a non-ferromagnetic barrel having a circular bore formed longitudinally therethrough;
   a magnetic proximity switch mounted in said bore of said barrel near one end of the barrel;
   a piston disposed in said bore near the other end of said barrel wherein said piston is axially aligned with said bore and said switch;
   a spring for urging said piston away from said proximity switch;
   at least one wiper surrounding said piston and forming a fluid tight seal between said bore and said piston; and
   a passageway longitudinally through the length of said piston to permit flushing fluid flow therethrough.

2. A detector for a meter prover as set forth in claim 1 wherein said piston is constructed of ferromagnetic material.

3. A detector for a meter prover as set forth in claim 1 wherein said bore is perpendicular to an axis of a pipe prover.

4. A detector for a meter prover as set forth in claim 1 including a pair of said wipers.

5. A detector for a meter prover as set forth in claim 4 wherein said pair of wipers are Teflon O-rings.

6. A detector for a meter prover as set forth in claim 1 wherein said barrel includes a face plate, an adapter, a hub and a base secured to the prover wherein the face plate, adapter, hub and base are removably secured together by fasteners.

7. A detector for a meter prover as set forth in claim 1 wherein portions of said hub and said proximity switch are coated with epoxy.

8. A detector for a meter prover as set forth in claim 6 wherein a pair of said wipers reside in recesses in said adapter.

9. A detector for a meter prover as set forth in claim 1 wherein said piston has a first end engaging said spring and an opposed end and wherein said passageway terminates at said opposed end.

10. A detector for a meter prover as set forth in claim 9 including a plurality of pressure equalization ports through said piston to said passageway.

11. A detector for a meter prover as set forth in claim 1 wherein said passageway passes through the center axis of said piston.

12. A detector for a meter prover as set forth in claim 1 wherein said piston has a cylindrical outer surface.

13. A detector for a meter prover comprising:

a non-ferromagnetic barrel having a circular bore formed through the axis of said barrel, wherein said bore is perpendicular to a pipe prover;

a magnetic proximity switch mounted in said bore of said barrel near one end of the barrel;

a piston having an outer cylindrical surface disposed in said bore near an opposite end of said barrel;

a spring for urging said piston away from said proximity switch;

a pair of wipers surrounding said piston and forming a fluid tight seal between said bore and said piston;

a passageway through an axis of said piston to permit fluid flow therethrough; and a plurality of pressure equalization ports through said piston to said passageway.

14. A detector for a meter prover as set forth in claim 13 wherein said piston is constructed of ferromagnetic material.

15. A detector for a meter prover as set forth in claim 13 wherein said pair of wipers are Teflon O-rings.

* * * * *